United States Patent
Portell et al.

(10) Patent No.: US 7,246,693 B2
(45) Date of Patent: Jul. 24, 2007

(54) SUPPORT HOUSING FOR TORQUE-TRANSMITTING MECHANISMS IN A POWER TRANSMISSION

(75) Inventors: Patrick S. Portell, Pinckney, MI (US); Teodor Mostior, Ann Arbor, MI (US)

(73) Assignee: General Motors Corporation, Detroit, MI (US)

( * ) Notice: Subject to any disclaimer, the term of this patent is extended or adjusted under 35 U.S.C. 154(b) by 150 days.

(21) Appl. No.: 11/049,832

(22) Filed: Feb. 3, 2005

(65) Prior Publication Data

US 2006/0011443 A1    Jan. 19, 2006

Related U.S. Application Data

(60) Provisional application No. 60/589,142, filed on Jul. 19, 2004.

(51) Int. Cl.
*F16D 25/10* (2006.01)
*F16D 25/0638* (2006.01)
(52) U.S. Cl. ............... 192/87.11; 192/70.2; 192/85 AA
(58) Field of Classification Search ............. 192/87.11; 475/146
See application file for complete search history.

(56) References Cited

U.S. PATENT DOCUMENTS

| | | | | |
|---|---|---|---|---|
| 3,384,214 A | * | 5/1968 | Wilson | ..................... 192/87.11 |
| 3,730,022 A | * | 5/1973 | O'Malley | ................... 475/146 |
| 3,803,948 A | * | 4/1974 | Clauss et al. | ............... 475/146 |
| 6,840,362 B2 | * | 1/2005 | Biermann et al. | ....... 192/48.92 |

* cited by examiner

*Primary Examiner*—Rodney H. Bonck
(74) *Attorney, Agent, or Firm*—Dan L. Thompson

(57) ABSTRACT

A piston support housing for a transmission assembly includes a plurality of axially-extending finger portions engaging a plurality of spline portions formed in a corresponding transmission case, and a plurality of friction plates are assembled adjacent the piston support housing such that the finger portions extend circumjacent peripheral edges of the friction plates. The friction plates include a plurality of torque-transmitting spline portions disposed circumferentially intermediate the finger portions. The friction plates also include a plurality of recesses disposed with one adjacent each of the finger portions to preclude contact between the finger portions and the friction plates thereby preventing torque-transmission through the finger portions to the transmission case.

12 Claims, 3 Drawing Sheets

US 7,246,693 B2

SUPPORT HOUSING FOR TORQUE-TRANSMITTING MECHANISMS IN A POWER TRANSMISSION

CROSS REFERENCE TO RELATED APPLICATION

This application claims the benefit of U.S. Provisional Application 60/589,142 filed Jul. 19, 2004, which is hereby incorporated by reference.

TECHNICAL FIELD

This invention relates to support housings for torque-transmitting mechanisms disposed within power transmissions and, more particularly, to support housings that are configured to house two pistons and axially ground piston forces.

BACKGROUND OF THE INVENTION

Automatic transmission assemblies sometimes include a piston housing member which houses a piston and its associated clutch plates. The clutch plates are engaged with internal splines of the piston housing member, and the piston housing member has external splines which are splined to a transmission case. The piston housing member may be axially secured with respect to the transmission case by one or more snap rings to axially ground forces of the piston.

With the clutch plates splined into the piston housing member, the piston housing member becomes a large component which adds mass and cost to the transmission assembly.

SUMMARY OF THE INVENTION

The invention provides a center piston housing which houses two oppositely facing pistons and includes a plurality of fingers extending circumjacent peripheral edges of clutch plates associated with the two pistons. Distal ends of the fingers abut other components of the transmission assembly to axially ground forces of the two pistons. The clutch plates are not splined into the center piston housing, so a lighter, less expensive assembly is achieved.

More specifically, a piston support housing for a transmission assembly includes a plurality of axially extending finger portions engaging a plurality of spline portions formed in a corresponding transmission case, and a plurality of friction plates are assembled adjacent the piston support housing such that the finger portions extend circumjacent peripheral edges of the friction plates and the friction plates include a plurality of torque-transmitting spline portions disposed circumferentially intermediate the finger portions. The friction plates also include a plurality of recesses disposed with one adjacent each of the finger portions to preclude contact between the finger portions and the friction plates thereby preventing torque-transmission through the finger portions to the transmission case.

The finger portions extend in opposite axial directions from a center hub portion, and a set of the friction plates are disposed on each side of the center hub portion with splines that are formed thereon intermediate the respective finger portions. The two sets of friction plates are part of two different torque-transmitting mechanisms.

The present invention does not increase mass or cost in comparison to prior art designs described previously.

The above features and advantages and other features and advantages of the present invention are readily apparent from the following detailed description of the best modes for carrying out the invention when taken in connection with the accompanying drawings.

DESCRIPTION OF THE PREFERRED EMBODIMENTS

Figure 1:
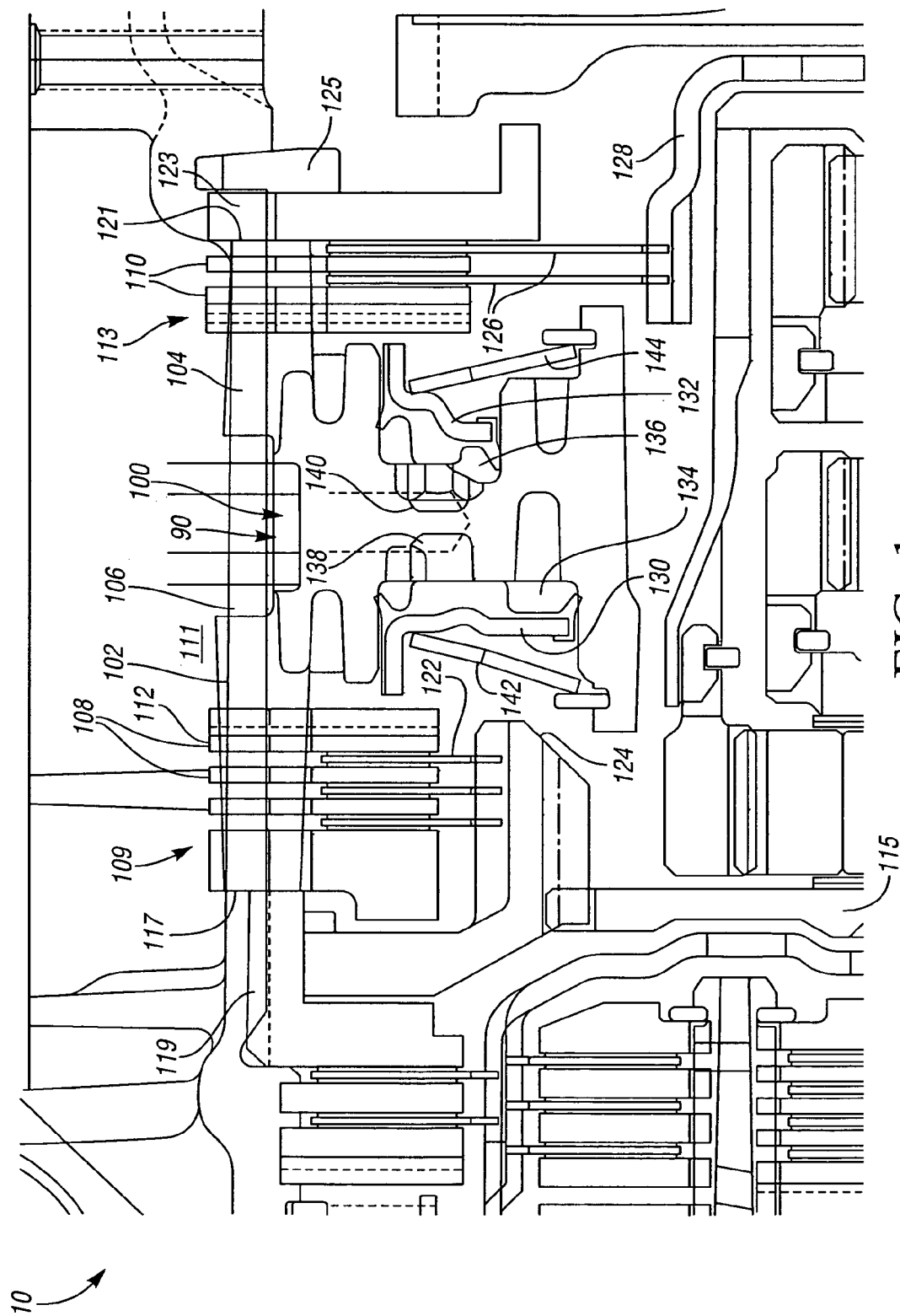
FIG. 1 shows a partial cross-sectional view of a portion of a transmission incorporating a center piston housing member in accordance with the invention.
Figure 2:
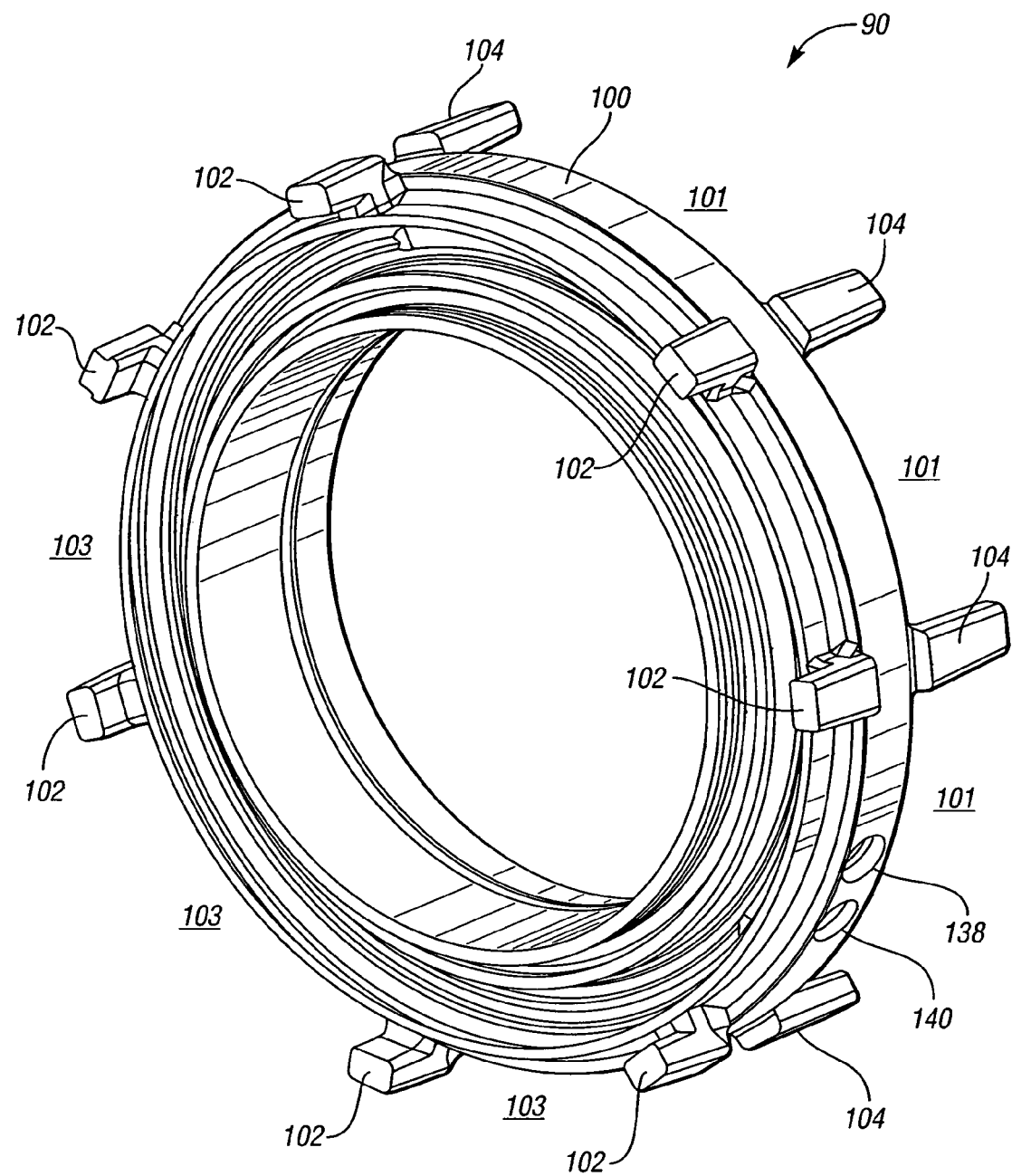
FIG. 2 shows a perspective view of the center piston housing member shown in FIG. 1.
Figure 3:
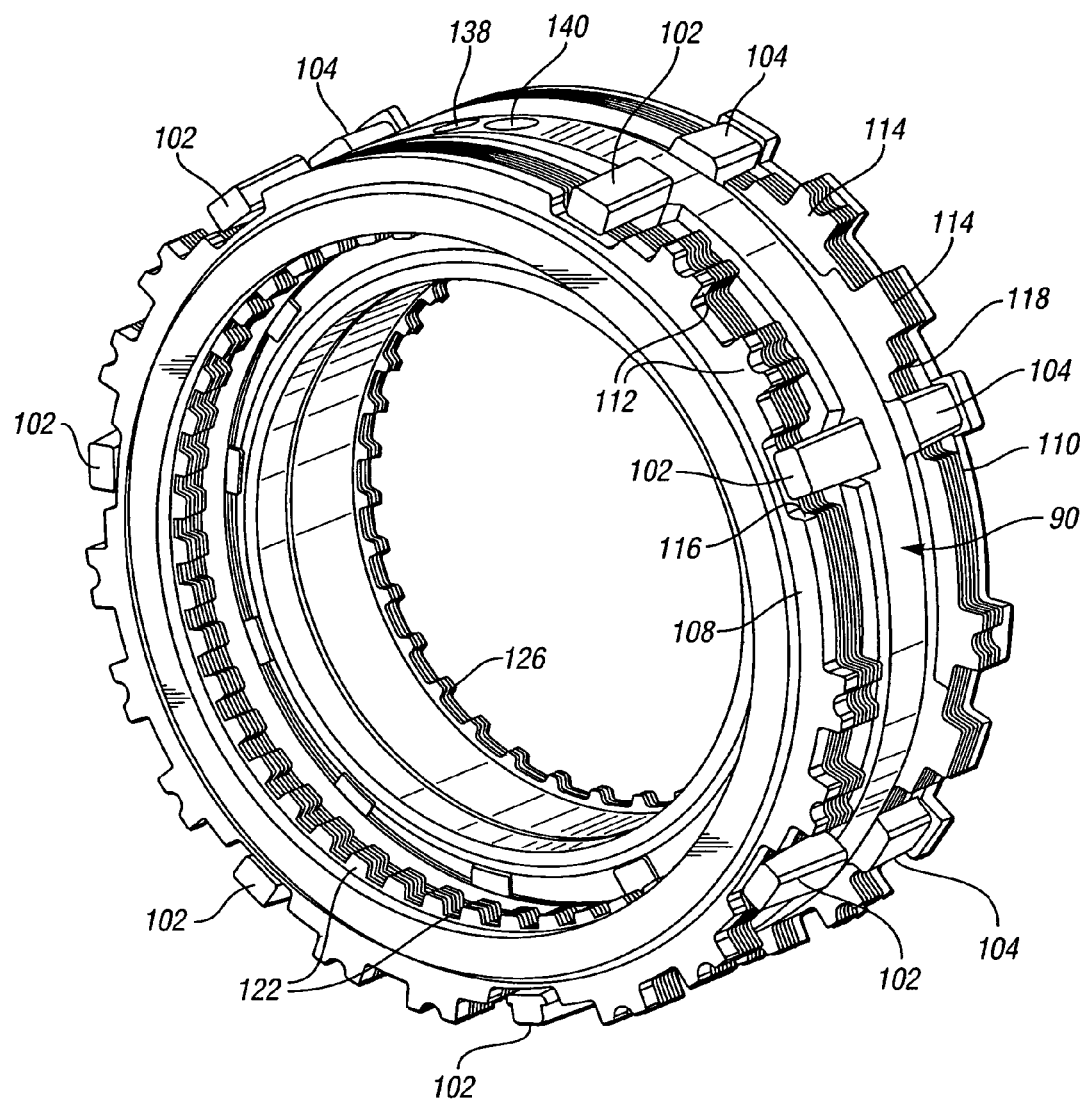
FIG. 3 shows a perspective view of the center piston housing member of FIGS. 1 and 2 with clutch plates assembled thereto.

FIG. 1 shows a partial cross-sectional view of a front wheel drive six-speed transmission 10. The transmission 10 includes a center piston housing member 90, as best seen in FIGS. 1, 2, and 3, which includes a cylindrical, ring-like center hub or body 100 having a plurality of splines or fingers 102, and a second plurality of splines or fingers 104 facing in a direction opposite to the fingers 102. The fingers 102 and 104 are spaced about the cylindrical body 100 such that large circumferential spaces 101, 103 formed between the fingers 102 and 104, respectively, as shown in FIG. 2. When installed in the transmission case 111, the fingers 102 and 104 engage in splines 106 that are formed in the transmission case 111.

The fingers 102 and 104 extend axially with respect to a central axis of the transmission, around which the center hub is disposed. The fingers 102 and 104 extend from the peripheral edges of opposing sides of the center hub 100.

A first plurality of friction plates 108 are disposed on the center piston housing 90 on the same side as the fingers 102 and a second plurality of friction plates 110 are disposed on the same side as the fingers 104. Each of the plates 108 has splined portions 112, which engage the splines 106, and each of the plates 110 has splined portions 114 (shown in FIG. 3), which also engage the splines 106 (shown in FIG. 1).

As can best be seen in FIG. 3, the plates 108 have recess portions 116, which permit the fingers 102 to pass through the plates 108 without contact. The plates 110 have recess portions 118, which permit the fingers 104 to pass through the plates 110 without contact. The plates 108 are components of the (fourth) torque-transmitting mechanism 109 and the plates 110 are components of the (fifth) torque-transmitting mechanism 113. The (fourth) torque-transmitting mechanism 109 also includes a plurality of friction plates 122, which are splined to a hub 124, which in turn is drivingly connected with the (third) planet carrier 115, as shown in FIG. 1. The (fifth) torque-transmitting mechanism 113 also includes a plurality of friction plates 126, which are splined with a hub 128, as shown in FIG. 1, which in turn is drivingly connected with the (first) sun gear member (not shown).

Referring to FIG. 1, the center piston housing member 90 slidably supports a first annular piston member 130 and a second annular piston member 132. The first annular piston member 130 is a component of the (fourth) torque-transmitting mechanism 109 and is adapted to enforce frictional engagement between the friction plates 108 and 122 when the piston 130 is pressurized. This will provide a torque-transmitting connection between the (third) planet carrier 115 and the transmission case 111.

The piston member 132 is a member of the (fifth) torque-transmitting mechanism 113, which when pressurized will enforce frictional engagement between the friction plates 110 and 126 thereby providing a torque-transmitting mechanism between the (first) sun gear member (not shown) and the transmission housing 111. The piston 130 is slidably disposed in a chamber 134 and the piston 132 is slidably disposed in a chamber 136. The chambers 134 and 136 are supplied with hydraulic fluid through passages within the transmission case 111, which are aligned with passages 138 and 140, respectively, that are formed in the cylindrical body portion 100.

The (fourth) torque-transmitting mechanism 109 also includes a Belleville spring 142, which acts as a return spring for the piston 130. The (fifth) torque-transmitting mechanism 113 has a Belleville spring 144, which provides a return spring for the piston 132.

The splines 112 engage the spline 106 of the transmission housing 111 as previously mentioned and do not engage the fingers 102. Thus, the fingers 102 do not transmit any torque from the (third) planet carrier 115 to the piston housing member 90 since all of this torque is transmitted through the friction plates 108 and the splines 112. The splines 114 transmit all of the torque from the (first) sun gear member (not shown) through the (fifth) torque-transmitting mechanism 113 to the transmission case 111 and the fingers 104 are relieved of any torque-transmitting load due to the recesses 118.

As shown in FIG. 1, the distal end 117 of the finger 102 abuts the one-way clutch 119, and the distal end 121 of the finger 104 abuts the backing plate 123, which is held in position by the snap ring 125 in the transmission case 111. Accordingly, the fingers 102 and 104 are operative to axially ground forces transmitted from the pistons 130 and 132 against the one-way clutch 119 and backing plate 123, respectively. In other words, the fingers 102 and 104 act as a spacer between the grounded one-way clutch 119 and backing plate 123 for grounding forces from the pistons 130 and 132.

While the best mode for carrying out the invention has been described in detail, those familiar with the art to which this invention relates will recognize various alternative designs and embodiments for practicing the invention within the scope of the appended claims.

The invention claimed is:

1. A transmission assembly, comprising:
a piston support housing having a plurality of axially extending finger portions engaging a plurality of spline portions formed in a transmission case;
a plurality of friction plates assembled adjacent said piston support housing and including a plurality of torque-transmitting spline portions disposed circumferentially intermediate said finger portions;
said friction plates also including a plurality of recesses disposed with one adjacent each of said finger portions to preclude contact between said finger portions and said friction plates thereby preventing torque-transmission through said finger portions to said transmission case.

2. The transmission assembly defined in claim 1 wherein: said finger portions extend in opposite axial directions from a cylindrical center hub; and
a set of said friction plates are disposed on each side of said center hub with splines that are formed thereon intermediate the respective finger portions.

3. The transmission assembly defined in claim 2, wherein said cylindrical center hub has first and second passages which carry hydraulic fluid for actuating first and second pistons on opposing sides of said center hub for engaging said sets of friction plates.

4. The transmission assembly defined in claim 3, wherein said axially extending finger portions have distal ends which are engaged with other transmission components for axially grounding forces associated with said first and second pistons.

5. A torque-transmitting mechanism assembly for a transmission having a transmission housing, comprising:
a piston support housing including a ring-like center hub having a plurality of finger portions extending axially from the peripheral edges of opposing sides of the center hub, said finger portions being engageable with splines on the transmission housing;
a first set of friction plates disposed radially inside, without touching, said finger portions which extend from a first side of said center hub, and a second set of friction plates disposed radially inside, without touching, said finger portions which extend from a second side of said center hub, wherein said first and second sets of friction plates each include outwardly extending splines which are engageable with splines on the transmission housing.

6. The torque-transmitting mechanism assembly of claim 5, wherein said center hub has first and second passages which carry hydraulic fluid for actuating first and second pistons on opposing sides of said center hub for engaging said first and second sets of friction plates, respectively.

7. The torque-transmitting mechanism assembly of claim 6, wherein said axially extending finger portions have distal ends which are engageable with other transmission components for axially grounding forces associated with said first and second pistons.

8. The torque-transmitting mechanism assembly of claim 6, wherein said first and second pistons are positioned radially inside said finger portions and in fluid communication with said first and second passages, respectively, for selective piston actuation away from said center hub toward the respective first and second sets of friction plates to engage the friction plates with corresponding interleaved friction plates for torque-transmission.

9. A transmission assembly comprising:
a transmission housing having splines thereon;
a piston support housing including a ring-like center hub having a plurality of finger portions extending axially from the peripheral edges of opposing sides of the center hub, said finger portions being engaged with said splines on the transmission housing;
a first set of friction plates disposed radially inside, without touching, said finger portions extending from a first side of said center hub, and a second set of friction plates disposed radially inside, without touching, said finger portions extending from a second side of said center hub;
wherein said first and second sets of friction plates each include outwardly extending splines which are engaged with said splines on the transmission housing.

10. The transmission assembly of claim 9, wherein said center hub has first and second passages which carry hydraulic fluid for actuating first and second pistons on opposing sides of said center hub for engaging said first and second sets of friction plates, respectively.

11. The transmission assembly of claim 10, wherein said axially extending finger portions have distal ends which are engaged with other transmission components for axially grounding forces associated with said first and second pistons.

12. The transmission assembly of claim 10, wherein said first and second pistons are positioned radially inside said finger portions and in fluid communication with said first and second passages, respectively, for receiving fluid to selectively actuate piston movement away from said center hub toward the respective first and second sets of friction plates to engage the friction plates with corresponding interleaved friction plates for torque-transmission.

* * * * *